United States Patent [19]

Klein

[11] Patent Number: 4,869,559
[45] Date of Patent: Sep. 26, 1989

[54] BRAKE-SLIP-CONTROLLED AUTOMOTIVE VEHICLE BRAKE SYSTEM

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 259,363

[22] Filed: Oct. 18, 1988

[30] Foreign Application Priority Data

Oct. 19, 1987 [DE] Fed. Rep. of Germany ....... 3735366

[51] Int. Cl.$^4$ .......................... B60T 8/32; B60T 8/42; B60T 8/44
[52] U.S. Cl. ...................................... 303/110; 303/61; 303/114; 303/115; 303/119
[58] Field of Search ............... 303/113, 114, 115, 119, 303/61-63, 68-69, 92, 100, 110, 111, 93; 180/197, 244, 245-250; 188/181

[56] References Cited

U.S. PATENT DOCUMENTS

| | | | |
|---|---|---|---|
| 3,617,099 | 11/1971 | Sugiyama et al. | 303/110 X |
| 4,206,950 | 6/1980 | Elliott | 303/110 |
| 4,509,802 | 4/1985 | Solleder et al. | 303/110 |
| 4,565,411 | 1/1986 | Seiber | 303/110 |
| 4,575,161 | 3/1986 | Vanzant et al. | 303/110 |
| 4,622,687 | 5/1987 | Leiber | 303/110 |
| 4,636,009 | 1/1987 | Tsuru et al. | 303/93 |
| 4,636,010 | 1/1987 | Adachi et al. | 303/115 |
| 4,655,509 | 4/1987 | Ando et al. | 303/115 X |
| 4,659,153 | 4/1987 | Klein | 303/114 |
| 4,660,899 | 4/1987 | Ando et al. | 303/115 |
| 4,714,296 | 12/1987 | Imoto et al. | 303/110 X |
| 4,715,664 | 12/1987 | Nakanishi et al. | 303/115 X |
| 4,718,737 | 1/1988 | Bach et al. | 303/93 X |
| 4,750,790 | 6/1988 | Klein | 303/110 |
| 4,753,491 | 6/1988 | Wupper | 303/115 |
| 4,755,008 | 7/1988 | Imoto et al. | 303/110 |
| 4,758,054 | 7/1988 | Brown | 303/110 X |
| 4,765,692 | 8/1988 | Miyake | 303/110 X |
| 4,778,225 | 10/1988 | Rudolph et al. | 180/197 X |
| 4,778,226 | 10/1988 | Brown | 303/110 X |
| 4,787,685 | 11/1988 | Klein | 303/110 X |

FOREIGN PATENT DOCUMENTS 3330236 3/1985 Fed. Rep. of Germany .
3545236 6/1987 Fed. Rep. of Germany .
3633687 4/1988 Fed. Rep. of Germany .
3640453 6/1988 Fed. Rep. of Germany .

Primary Examiner—Douglas C. Butler
Attorney, Agent, or Firm—James B. Raden

[57] ABSTRACT

In a brake-slip-controlled automotive vehicle brake system, a pedal-operated master cylinder is provided which applies hydraulic fluid to the wheel brake circuits via at least one braking pressure modulator and via one electromagnetically operated closing valve at a time. The pressure modulator comprises a volume receiver and a pneumatic piston-and-cylinder arrangement acting on the volume receiver and connected with a vacuum source and a pressure source via a change-over valve actuated by a brake slip control circuit. Inserted into each hydraulic line between the master cylinder and the pressure modulator is an electromagnetically operated pilot valve having a normal operating position and a suction position. A traction slip control circuit switches the pilot valves over upon the occurrence of traction slip and ensures that the pressure modulator is reversed to the direction of increasing volume admission. Subsequently, the return spring, tensioned during this reversal, and the atmospheric pressure will, by a new reversal of the change-over valve, be made use of for a pressure build-up in the wheel brake cylinder of the wheel showing traction slip.

10 Claims, 3 Drawing Sheets

BRAKE-SLIP-CONTROLLED AUTOMOTIVE VEHICLE BRAKE SYSTEM

BACKGROUND OF THE INVENTION

1. Field of the Invention

This invention relates to a brake-slip-controlled automotive vehicle brake system.

2. Description of the Relevant Art

In such automotive vehicle brake systems a change-over valve is generally connected, via one of its connections, to a vacuum source of the automotive vehicle. The vacuum source can be, for example, formed by the suction pipes of the engine. The other connection is generally connected to the atmospheric pressure so that the actuation of the pressure modulator is effected by the difference between atmospheric pressure and vacuum.

Upon detection by a brake slip control circuit of wheel slip at any one of the vehicle's wheels during braking, the change-over valve will be switched so that its piston-and-cylinder arrangement will cause the volume receivers to receive an increased volume of fluid resulting in a reduction in the braking pressure. At the same time, closing valves of the individual wheel brake circuits are operated in a pulse-like manner so that there will be a braking pressure reduction only in the brake circuits of the wheels showing wheel slip.

It is an object of the present invention to provide a brake-slip-controlled automotive vehicle brake system of the type referred to above which also permits traction slip control of the vehicle's driven wheels by means of slight constructional modification while fully making use of the components already provided.

SUMMARY OF THE INVENTION

In accordance with the present invention a brake-slip-controlled automotive vehicle brake system comprises a pedal-operated master cylinder for applying hydraulic fluid to wheel brake circuits via at least one braking pressure modulator and via an electromagnetically operated closing valve. The pressure modulator comprises a volume receiver, which is provided with a separating valve and a pneumatic piston-and-cylinder arrangement acting on the volume receiver, connected to a vacuum source and to a pressure source via an electromagnetically operated change-over valve actuated by a brake slip control circuit. The connection is such as to ensure that, in the normal position of the change-over valve, the pneumatic piston is biased by a return spring into a position wherein the volume receiver takes up the smallest volume and, by opening of the separating valve, a communication is established between the master cylinder and the wheel brake circuits. In the change-over position of the change-over valve, with the separating valve closed, the pneumatic piston is moved against the force of the return spring to increase the volume of the volume receiver.

This invention provides that an electromagnetically operated pilot valve is inserted into each line between the master cylinder and the pressure modulator. Each valve has a normal position with a free passage in either direction and a suction position with a free passage only in the direction from the master cylinder to the pressure modulator and with a closed passage in the opposite direction. Each separating valve has a connectable by-pass and a traction slip control circuit is provided which is acted upon by the wheel speed sensors to actuate the pilot valves, the change-over valve, the by-pass, and the closing valves for the wheel brake cylinders of the driven wheels, in dependence on the traction slip signals of the driven wheels, so that as traction slip is detected, the pilot valves are first switched into their suction positions, the change-over valve is changed to its change-over position and the normally closed by-pass is opened. As a result, the pressure modulator displaces the volume receiver(s) into their positions of increased and, if applicable, maximum volume admission to take in hydraulic fluid through the pilot valves and each by-pass. Subsequently, the change-over valve is switched to a position wherein the control pressure application to the pressure modulator ceases, and the closing valves associated with the driving wheels are actuated by the traction slip control circuit so that the increased pressure now generated by the return spring is passed on to the wheel brake cylinders of the driven wheels to an extent which just prevents traction slip.

The inventive idea can be seen in the fact that upon occurrence of traction slip at any one of the vehicle's driven wheels, the pressure modulator, by means of the reversal of the change-over valve, is reversed in as rapid a manner as possible to a position wherein the maximum or, at least a larger volume, is received. The additional amount of hydraulic fluid required to this end is taken in from the master cylinder through the correspondingly positioned pilot valves. If, subsequently, the change-over valve is switched back again into its initial position within a very short time, there will be no pressurization of the piston-and-cylinder arrangement, and the return spring, via the volume receivers, can now build up a considerably increased pressure in the wheel brake circuits upstream of the closing valves. If now the closing valves associated with the driving wheels are opened in a suitable pulse-like manner by the traction slip control circuit the driving wheels can be braked so as to eliminate the traction slip.

By means of additionally building in two pilot valves and two separating valves it is thus possible to use the brake-slip-controlled automotive vehicle brake system of the type referred to above, for traction slip control.

A preferred further embodiment of this invention is characterized in that two hydraulic lines, with one pilot valve each, lead from a tandem master cylinder to one volume receiver each. The volume receivers are acted upon by the same pressure modulator. In other words, this invention is advantageously used in the case of dual circuit brake systems having brake circuits which are arranged diagonally to each other.

The traction slip control circuit acts on the connected closing valves preferably in a pulse-like manner. The pulse duration is modulated in correspondence with the traction slip signals.

Further, the above-described mode of operation of the pilot valves preferably is realized in that, in the suction position, the pilot valves connect a non-return valve into the hydraulic lines, with the non-return valves preferably integrated into the pilot valves. However, it is also possible for the non-return valves to each be connected in parallel with a pilot valve having a passage position and a locking position.

So as to bridge the separating valve at the bottom of the volume receivers during suction in the traction slip control phase, the first embodiment provides that the by-pass is arranged directly at the associated volume receiver and is lockable by a controlled slide valve. In this embodiment it is expedient for the slide to have a piston biased into the open position by means of a spring and acted upon by the pressure in the feed line from the pilot valve to the volume receiver so that, in the case of pressure in the feed line, the by-pass is closed, yet is open when there is no pressure or when there is a vacuum in the feed line.

Another way of bridging the separating valve, closing upon the movement of the plungers with the volume receivers for the intake of hydraulic fluid, is to provide the pilot valve with a passage position and a suction position with two different outlets in the two operating positions. One outlet is connected during either operating position. The feed line to the volume receiver is connected to the outlet effective in the passage position, and a connection line forming the by-pass connects the outlet, effective in the suction position, with the chamber between the separating valve and the plunger of the volume receiver.

A preferred embodiment of the invention is illustrated in the drawings and described in detail in the following specification.

DESCRIPTION OF THE PREFERRED EMBODIMENTS

Figure 1:
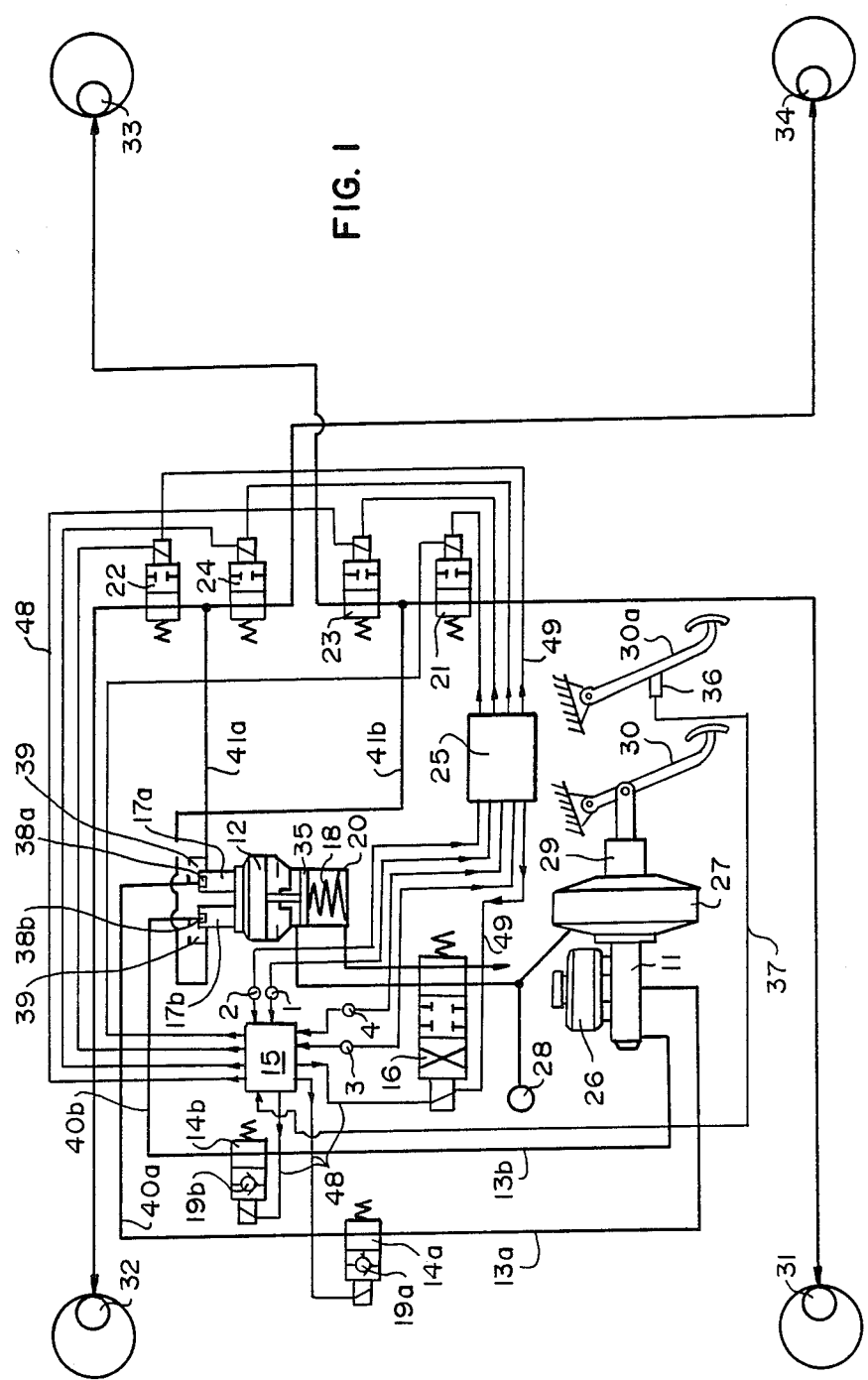
FIG. 1 shows a schematic diagram of an inventive automotive vehicle brake system.

According to FIG. 1, an automotive vehicle has a wheel brake cylinder 31, 32 at each front driving wheel. Schematically outlined wheel brake cylinders 33, 34 are provided at the two non-driven rear wheels.

Wheel brake cylinder pairs 31, 33 and 32, 34, which are arranged diagonally to each other, are connected to one volume receiver 17a, 17b each, of a pressure modulator 12, via closing valves 21, 23 and 22, 24 individually associated with each wheel brake cylinder and via lines 41a and 41b. Each volume receiver 17a, 17b has a separating valve 38a, 38b. Moreover, the volume receivers 17a, 17b are connected with the two outlets of a tandem master cylinder 11 via feed lines 40a and 40b, pilot valves 14a and 14b, and connection lines 13a and 13b. A brake-fluid-filled supply reservoir 26 is arranged at said tandem master cylinder 11. In FIG. 1, the tandem master cylinder 11 is connected with a pneumatic brake booster 27. By means of its non-illustrated vacuum chamber, brake booster 27 is connected to a vacuum source 28 and via a non-illustrated usual control valve provided in an extension 29, brake booster 27 is applied by actuation of brake pedal 30. As such, it is possible to connect the pressure chamber in a controlled manner to the atmospheric pressure.

The pilot valves 14a, 14b have two operating positions. In the normal position illustrated in FIG. 1, the pilot valves 14a, 14b allow free passage. In the other operating position, caused by the actuation of a solenoid, non-return valves 19a, 19b are connected into the hydraulic lines 13a, 13b respectively, leading from the master cylinder 11 to the volume receivers 17a, 17b, so that hydraulic fluid can only flow from the master cylinder 11 to the volume receivers 17a, 17b, but not in the opposite direction.

Wheel speed sensors 1, 2, 3, 4, schematically outlined in FIG. 1, are arranged at the individual vehicle wheels. Via lines, indicated by broken lines in FIG. 1, the sensors supply signals, representative of the rotational velocity of the vehicle's wheels, to a brake slip control circuit 25. The brake slip control circuit 25 determines at which of the vehicle's wheels there occurs a slip and emits corresponding signals to the individual valves in the manner described hereinafter.

One of the output signals of the brake slip control circuit 25 is supplied to an electromagnetically operated change-over valve 16 which, as illustrated in FIG. 1, has three positions. In the normal position illustrated in the drawing, the change-over valve 16 connects the vacuum source 28 with the upper pressure chamber of a piston-and-cylinder arrangement 20 driving the pressure modulator 12. The piston 35 of the piston-and-cylinder arrangement 20 is acted upon by a return spring 18 to cause the volume receivers 17a, 17b to be displaced in the direction of the smallest volume admission, i.e. upwards in FIG. 1. The lower pressure chamber of the piston-and-cylinder arrangement 20 is connected to the atmosphere via the change-over valve 16.

In the mid-position, the change-over valve 16 locks the two pressure chambers of the piston-and-cylinder arrangement 20 against the outside and with respect to each other so that in this position of the change-over valve 16 a metered-in intermediate pressure can be maintained in the piston-and-cylinder arrangement 20 which is expedient for certain control operations. The vacuum and the atmospheric pressure are separated from the piston-and-cylinder arrangement in this mid-position. In the third position, the change-over valve 16 exchanges the atmospheric-pressure and vacuum connections so that the vacuum is supplied to the lower pressure chamber of the piston-and-cylinder arrangement 20, and the atmospheric pressure is supplied to the upper pressure chamber.

As indicated in FIG. 1 by broken lines crossed by an arrow, the separating valve 38a, 38b provided in the volume receivers 17a, 17b can each be bridged by a connectable by-pass 39.

The mode of operation of the described automotive vehicle brake system is described below:

During normal braking, the pressure generated by the master cylinder 11 is passed on to the individual wheel brake cylinders 31, 32, 33, 34 via the connection lines 13a, 13b, the open passages of the pilot valves 14a, 14b, the feed lines 40a, 40b, the volume receivers 17a, 17b, the lines 41a, 41b, and the open passages of the closing valves 21, 22, 23, 24. Thus, the vehicle can be braked in the usual manner. The volume receivers 17a, 17b are in their rest positions evident from FIG. 1, in which position they displace a maximum volume.

If a brake slip is detected at any one of the wheels by any one of the wheel speed sensors 1, 2, 3, 4 during braking, the brake slip control circuit 25 will switch the change-over valve 16 into the third position wherein the vacuum is connected to the lower pressure chamber of the piston-and-cylinder arrangement 20 and atmospheric pressure is supplied to the upper pressure chamber. As a result, the piston 35 will be moved downwards and the plungers of the volume receivers 17a, 17b will increase the volume within the wheel brake circuits after the closing of the separating valves 38a, 38b. This will lead to a corresponding reduction of the braking pressure. At the same time, the closing valves 21, 22, 23, 24 in the individual wheel brake circuits will be actuated by the brake slip control circuit 25, in a pulse-like manner, so that there will be a braking pressure reduction only in the brake circuit of the wheel at which a brake slip has been detected the reduction is effected to just an extent as to eliminate the brake slip. The wheel brake cylinders at the wheels of which there is no brake slip will be separated from the volume receivers 17a, 17b by a corresponding switching action of the associated closing valve. By switching the change-over valve 16 into the mid-position it is possible to determine a desired intermediate pressure in the volume receivers 17a, 17b ranging between zero and the master cylinder pressure.

Further according to this invention, a traction slip control circuit 15 is provided which is likewise actuated by the wheel speed sensors 1, 2, 3, 4. The traction slip control circuit 15 controls the change-over valve 16, the pilot valves 14a, 14b, and the closing valves 21, 22 associated with the driving wheels as illustrated by control lines 48, represented by solid lines in the drawing. The control lines 49 connected with the brake slip control circuit 25, however, also are represented by lines in the drawing.

If traction slip is detected at either drive wheel due to excessive application of accelerator pedal 30A, the traction slip control circuit 15 will switch the change-over valve 16 into the third position and, simultaneously, the pilot valves 14a, 14b into the suction position so that now the non-return valves 19a, 19b will be connected between the connection lines 13a, 13b and the feed lines 40a, 40b.

As a result, the lower pressure chamber of the piston-and-cylinder arrangement 20 is connected to the vacuum and the upper pressure chamber is in communication with the atmospheric pressure to move the piston 35 abruptly downwards, with the plungers of the volume receivers 17a, 17b reaching their positions of maximum volume admission. If, upon this displacement, the otherwise closed by-passes 39 are open, hydraulic fluid will be taken in from the supply reservoir 26 via the non-return valves 19a, 19b and the master cylinder 11. After the piston 35, with the return spring 18 being compressed, has reached the position corresponding to a partial volume increase or, preferably, to the maximum volume admission, the traction slip control circuit 15 will switch the change-over valve 16 into the first position, shown in FIG. 1, thereby reversing the pressure difference at the piston 35 and closing all by-passes 39. The return spring 18 and the atmospheric pressure will act on the plungers of the volume receivers 17a, 17b with the effect that the volume previously taken in will be displaced into the wheel brake circuits; limited so as not to lock by the suitably controlled valves 21, 22, 23, 24. Correspondingly, a braking pressure, required for eliminating the traction slip, will be generated in the wheel brake circuits.

Simultaneously with actuating the change-over valve 16 into the third position described above, the control circuit 15 will also act on the four closing valves 21, 22, 23, 24 so as to separate the individual wheel brake cylinders 31, 32, 33, 34 from the volume receivers 17a, 17b in order to prevent the generation of a vacuum in the wheel brake cylinders. The control circuit 15 will also act on the four closing valves 21, 22, 23, 24 to prevent the generation of a braking pressure in the individual wheel brake cylinders 31, 32, 33, 34 at the movement of change-over of valve 16 into the first position (FIG. 1), unless a wheel brake cylinder is to be pressurized by braking pressure, in a controlled manner, because traction slip has been detected at that wheel.

In such a case, the front wheel brake cylinder 31 or 32, where the traction slip control circuit 15 has detected a traction slip, will be supplied with pressure by pulse-like and short-time opening of the associated closing valve 21 or 22. The pressure will be supplied to an extent as to just brake the respective wheel so as to eliminate traction slip. If traction slip occurs at both driving wheels 31, 32, the two associated closing valves 21, 22 will be opened individually to the extent required.

This invention thus makes use of the fact that all the components of the brake-slip-controlled automotive vehicle brake system, of the type illustrated, have not been utilized during the acceleration of the vehicle to prevent traction slip. According to this invention, during acceleration these components are employed for appropriate use in traction slip control.

According to a further embodiment, a motion sensor 36 can be provided at the accelerator pedal 30A. The motion sensor 36 will respond to the depression of the accelerator pedal 30A and inform the traction slip control circuit 15 via a line 37 as soon as the accelerator 30A is depressed. In this way, the traction slip control circuit 15 can switch over valves 14a, 14b and 16 before the occurrence of traction slip so that the piston-and-cylinder arrangement 20 will be reversed and the piston 35, with the return spring 18 tensioned, will be displaced into the lower position where the volume receivers 17a, 17b take up the maximum volume. At the same time, the traction slip control circuit 15 will only have to open the closing valve 21 or 22 associated with the corresponding slipping wheel so as to prevent the traction slip by means of a corresponding braking thereby eliminating any delay. Due to this preferred further embodiment, it is possible to dispense with an excessively rapid operation of the individual valves as the same will have been brought into a ready position by the signal of sensor 36 before the occurrence of a traction slip.

Figure 2:
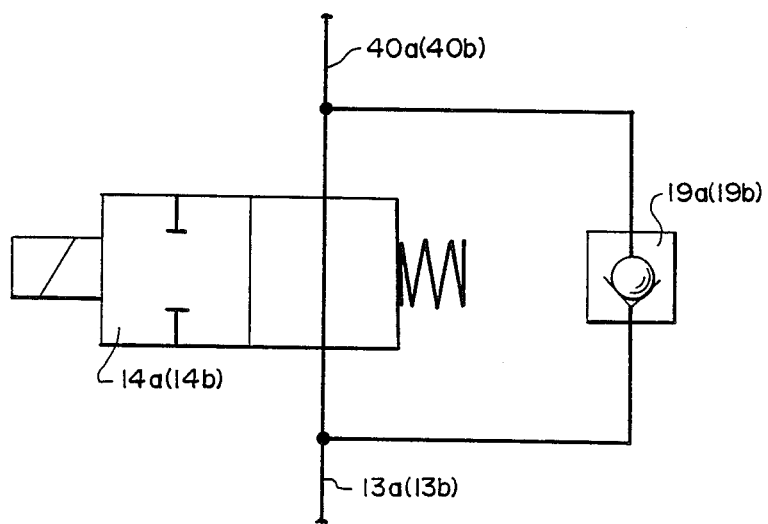
FIG. 2 shows a schematic diagram of another embodiment of the pilot valves enabling an intake of hydraulic fluid.

FIG. 2 illustrates how this invention can be realized using a normal two-position pilot valve 14a and 14b having a locking position and a passage position. In this case the pilot valve 14a, 14b is bridged by a non-return valve 19a, 19b which opens relative to the feed line 40a, 40b in case of excessive pressure in the connection line 13a, 13b.

Figure 3:
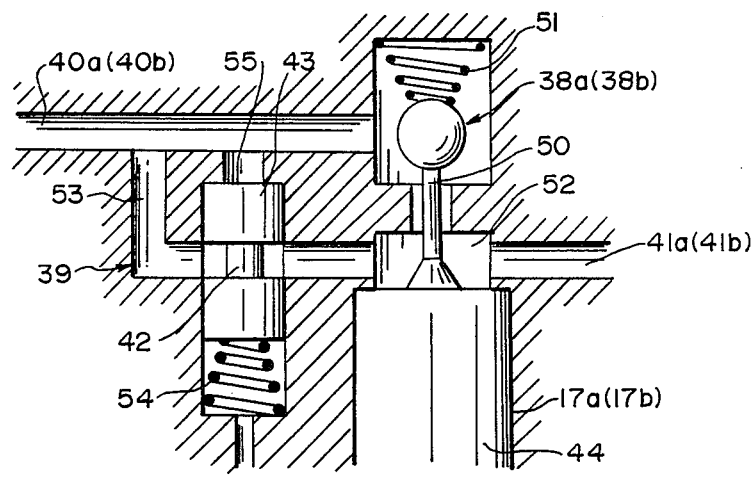
FIG. 3 shows a side view of a volume receiver, partially in section, of a type used in the inventive automotive vehicle brake system.

FIG. 3 shows a volume receiver 17a, 17b and its associated plunger 44 in its rest position. The plunger 44 is biased by a non-illustrated spring into this rest position. The separating valve 38a, 38b is held in the open position by a tappet 50, connected with the plunger 44, while a helical compression spring 51 biases the valve 38a, 38b into its closing position. Upon retraction of the plunger 44, the separating valve will close automatically.

The chamber 52, between the plunger 44 and the valve 38a, 38b, is connected with the line 41a, 41b leading to the closing valves 21, 22, 23, 24 and, also with a line 53 forming a by-pass 39 extending between the feed line 40a, 40b and the chamber 52. In the line 53, there is provided a slide valve 42 biased at a first end by a spring 54 into the open position shown in FIG. 3. Further, a piston 43 is attached to the slide valve 42, and the piston's pressure surface 55, remote from the first end and from the spring 54, is acted upon by the pressure in the feed line 40a, 40b through a channel 56. The chamber in which the spring 54 is arranged communicates with the atmosphere.

Due to the described embodiment, the separating valve 38a, 38b of the volume receiver 17a, 17b is open when in the rest position shown in FIG. 3, thereby connecting the feed line 40a, 40b with the line 41a, 41b. During a normal braking, the hydraulic braking pressure ensuing in feed line 40a, 40b will act on the pressure surface 55 of piston 43, to displace the slide 42 into its closed position wherein the piston 43 will close the by-pass 39.

As brake slip control occurs, the plunger 44 will be retracted and the separating valve 38a, 38b will close as the tappet 50 is likewise retracted and as the spring 51 urges the separating valve 38a, 38b into its closed position. By means of controlled retraction of the plunger 44 it will thus be possible to reduce the braking pressure in the lines 41a, 41b and, hence, in the wheel brake circuits in the desired controlled manner.

In case of traction slip control, the pilot valves 14a, 14b will be switched to the suction position. Upon retraction of the plunger 44, with a resulting momentary reduction in the pressure in the feed line 40a, 40b, the slide 42 will be displaced into the open position shown in FIG. 3. Despite the separating valve 38a, 38b being closed upon the retraction of the plunger 44, communication between the feed line 40a, 40b and the chamber 52 of the volume receiver 17a, 17b will be maintained and the retracting plunger 44 can take in a corresponding volume of brake fluid from the master cylinder 11.

Once the required amount of brake fluid has been taken in the plunger 44 is switched into its reversed direction of movement so as to increase the braking pressure in the wheel brake circuits. The non-return valves 19a, 19b in the pilot valves 14a, 14b will close immediately, and the slide 42 will move back into its closed position due to the pressure increase in the feed line 40a, 40b. The plunger 44 can now cause a braking in the wheel brake circuits in correspondence with the ensuing traction slip.

Figure 4:
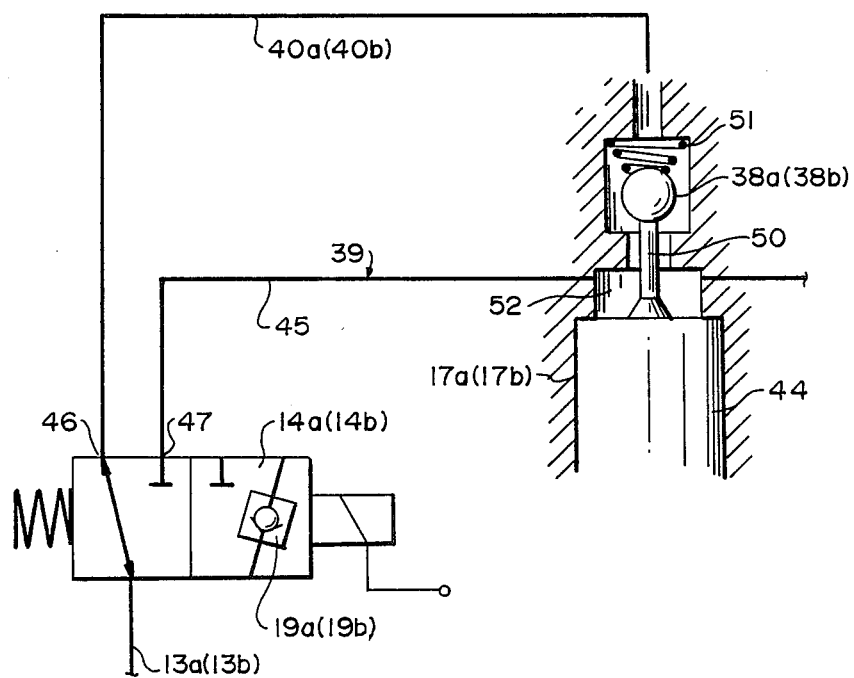
FIG. 4 shows a schematic partial view of a further embodiment of the present invention where the by-pass of the separating valve at the volume receiver is realized in another way.

In the alternative embodiment, shown in FIG. 4, a connection line 45, forming the by-pass 39, connects the chamber 52 of the volume receiver 17a, 17b with one outlet 47 of a pilot valve 14a, 14b which is provided with two outlets 46, 47. The other outlet 46 is connected at the inlet of the separating valve 38a, 38b via the feed line 40a, 40b. In the pilot valve's normal braking position shown in FIG. 4, the connection line 13a, 13b is connected with the inlet of the separating valve 38a, 38b via the pilot valve 14a, 14b and the outlet 46 as well as the feed line 40a, 40b.

In the traction slip operating position, the outlet of the non-return valve 19a, 19b will be connected with the other outlet 47 and the chamber 52 between the plunger 44 and the separating valve 38a, 38b of the volume receiver 17a, 17b via the connection line 45. This ensures that the separating valve 38a, 38b of the volume receiver 17a, 17b will be bridged by the by-pass 39 as early as with the change-over of the pilot valve 14a, 14b. As such, it will be possible to immediately take in brake fluid via the non-return valve 19a, 19b upon the retraction of the plunger 44.

The hydraulic action on the plunger 44 will, in each case, counterbalance the sum of the force of the spring 18 and of the force of the air pressure at the piston 35. According to this invention, for safety reasons the spring 38 is rated so as to ensure that it, by itself, will be able to return the plunger 44 into the final position as shown in FIGS. 3 and 4 and to open the separating valve 38a, 38b.

While the preferred embodiments of the invention have been described in detail above, in relation to a brake-slip-controlled automotive vehicle brake system, it will be apparent to those skilled in the art, that the disclosed embodiment may be modified. Therefore, the foregoing description is to be considered exemplary rather than limiting and the true scope of the invention is that described in the following claims.

What is claimed is:

1. A brake-slip-controlled automotive vehicle brake system having a pedal operated master cylinder for applying fluid to a wheel brake circuit by way of hydraulic brake lines, a braking pressure modulator, a pneumatic control line for said pressure modulator and an electromagnetically operated closing valve associated with the wheel of the automotive vehicle, said pressure modulator comprising a volume receiver, having a separating valve and a plunger forming a chamber therebetween, and a pneumatic piston-and-cylinder apparatus responsive to said pneumatic control line and which, acts on said volume receiver, and is connected to a vacuum source and a pressure source via an electromagnetically operated change-over valve actuated by a brake slip control circuit, said connection being such as to ensure that in the normal position of the change-over valve, said pneumatic piston is biased by a return spring into a position in which said volume receiver takes up the smallest volume and said separating valve is open thereby establishing a communication between said master cylinder and said wheel brake circuit, and that in the change-over position of the change-over valve, said separating valve is closed and said pneumatic piston is moved against the force of said return spring into a position in which the volume of said volume receiver increases wherein an improvement comprises:

an electromechanically operated pilot valve, inserted into said pneumatic control line between said master cylinder and said pressure modulator, said valve having a normal position allowing free passage in either direction and a suction position allowing free passage only in the direction from said master cylinder to said pressure modulator;

a connectable by-pass connected to said brake line and extending around said separating valve;

a wheel speed sensor attached to each of said wheel brake circuits;

a traction slip control circuit, for receiving signals from said wheel speed sensors, which actuates said pilot valve, said change-over valve, said by-pass, and said closing valve of the driven wheel, in dependence on the signals from said wheel speed sensor at the driven wheel, so that as traction slip is detected, said pilot valve is first switched to the suction position, the change-over valve is switched to the change-over position, and said by-pass, being normally closed, is opened, whereupon said pressure modulator displaces said volume receiver into an increased volume position to take in hydraulic fluid through said pilot valve and by-pass, and subsequently, said change-over valve is switched to a position wherein the control pressure applied to said modulator ceases, and the closing valve associated with the driving wheel is actuated by the traction slip control circuit to pass the increased pressure, generated by said return spring, to the wheel brake cylinders of the driven wheel to the extent required to prevent traction slip.

2. The automotive brake system, defined in claim 1, further comprising:
   a tandem master cylinder;
   two volume receivers;
   two hydraulic lines, each having a pilot valve, connected between said tandem master cylinder and said volume receivers, with both volume receivers acted upon by said pressure modulator.

3. The automotive brake system, defined in claim 1, wherein said traction slip control circuit acts on said closing valve in a pulse-like manner, said pulse duration being modulated in dependence upon said speed sensor signal.

4. The automotive brake system, defined in claim 1, wherein said pilot valve further comprises a non-return valve which, when in the suction position, is connected into said hydraulic brake line to allow flow in the direction of the pressure modulator only.

5. The automotive brake system, defined in claim 4, wherein said non-return valve is integrated into said pilot valve.

6. The automotive brake system, defined in claim 4, wherein said non-return valve is connected in parallel with said pilot valve, and said pilot valve has a passage and a closed position.

7. The automotive brake system, defined in claim 1, wherein said by-pass is located at said associated volume receiver and is operable by a controlled slide valve.

8. The automotive brake system, defined in claim 7, wherein said slide valve comprises a piston which is biased into an open position, and is acted upon by pressure in said hydraulic line, extending from said pilot valve to said volume receiver, so that, in the case of pressure in said feed line, the by-pass is in a closed position, and in the case of no pressure in said feed line or when there is vacuum in said feed line, said by-pass is in an open position.

9. The automotive brake system, defined in claim 1, said pilot valve further comprises a passage position and a suction position, having first and second outlets associated therewith;
   said first outlet connectable, in a first operating position of said pilot valve, to connect said feed line to said volume receiver; and
   said second outlet connectable, in a second operating position of said pilot valve, to connect a pneumatic line forming said by-pass with said chamber in said volume receiver.

10. The automotive brake system, defined in claim 1, further comprising;
   a motion sensor, attached to the accelerator of said automotive vehicle, which sensor is connected to the traction slip control circuit;
   said control circuit actuable upon a depression of the accelerator pedal to operate said pilot valve, said change-over valve, and said closing valve into the ready position occupied by said valves prior to the occurrence of traction slip and subsequent control.

* * * * *